US007460972B2

United States Patent
Somayaji et al.

(10) Patent No.: US 7,460,972 B2
(45) Date of Patent: Dec. 2, 2008

(54) METHODS AND SYSTEMS FOR PERFORMING REAL-TIME WIRELESS TEMPERATURE MEASUREMENT FOR SEMICONDUCTOR SUBSTRATES

(75) Inventors: Sharathchandra Somayaji, Sunnyvale, CA (US); Christopher L. Beaudry, San Jose, CA (US); David Quach, San Jose, CA (US)

(73) Assignee: Sokudo Co., Ltd., Kyoto (JP)

( * ) Notice: Subject to any disclaimer, the term of this patent is extended or adjusted under 35 U.S.C. 154(b) by 0 days.

(21) Appl. No.: 11/689,384

(22) Filed: Mar. 21, 2007

(65) Prior Publication Data

US 2008/0097714 A1    Apr. 24, 2008

Related U.S. Application Data

(60) Provisional application No. 60/862,186, filed on Oct. 19, 2006.

(51) Int. Cl.
G06F 19/00 (2006.01)
G06F 17/40 (2006.01)
G01K 11/00 (2006.01)

(52) U.S. Cl. .................. 702/130; 340/500; 340/539.1; 340/540; 340/870.01; 340/870.07; 340/870.16; 340/870.17; 340/870.28; 374/100; 374/141; 374/149; 438/5; 438/14; 702/187; 702/189

(58) Field of Classification Search .................. 216/13, 216/16, 55; 340/500, 539.1, 540, 870.01, 340/870.07, 870.16, 870.17, 870.28; 374/100, 374/137, 141, 149, 163, 178, 179, 189, 210; 438/5, 14; 700/90, 117, 121, 207, 211; 702/1, 702/127, 130, 133, 187, 189
See application file for complete search history.

(56) References Cited

U.S. PATENT DOCUMENTS

| | | | | | |
|---|---|---|---|---|---|
| 3,742,174 | A | * | 6/1973 | Harnden, Jr. | 219/627 |
| 3,742,178 | A | * | 6/1973 | Harnden, Jr. | 219/627 |
| 3,742,179 | A | * | 6/1973 | Harnden, Jr. | 219/627 |
| T104,003 | I4 | * | 3/1984 | Hall et al. | 712/28 |
| 4,716,411 | A | * | 12/1987 | Nakamura | 340/870.17 |
| 5,969,639 | A | * | 10/1999 | Lauf et al. | 340/870.17 |
| 6,568,848 | B1 | * | 5/2003 | Chapman et al. | 374/155 |
| 7,282,675 | B2 | * | 10/2007 | Quach et al. | 219/444.1 |
| 2006/0130750 | A1 | * | 6/2006 | Ishikawa et al. | 118/300 |
| 2006/0182536 | A1 | * | 8/2006 | Rice et al. | 414/217 |
| 2006/0237433 | A1 | * | 10/2006 | Quach et al. | 219/444.1 |
| 2007/0147468 | A1 | * | 6/2007 | Matsumoto et al. | 374/100 |
| 2008/0006619 | A1 | * | 1/2008 | Salinas et al. | 219/446.1 |
| 2008/0097714 | A1 | * | 4/2008 | Somayaji et al. | 702/99 |
| 2008/0142500 | A1 | * | 6/2008 | Tomita et al. | 219/444.1 |

\* cited by examiner

*Primary Examiner*—Edward R Cosimano
(74) *Attorney, Agent, or Firm*—Townsend and Townsend & Crew LLP (57) ABSTRACT

A monitor device includes a substrate and a plurality of temperature sensors disposed in the substrate. The monitor device also includes a processor coupled to the substrate and adapted to receive one or more signals from the plurality of temperature sensors. The processor is further adapted to convert the one or more received signals into one or more converted signals. The monitor device further includes a transceiver coupled to the substrate and adapted to receive the one or more converted signals. The transceiver is further adapted to transmit one or more output signals to an external receiver.

17 Claims, 6 Drawing Sheets

METHODS AND SYSTEMS FOR PERFORMING REAL-TIME WIRELESS TEMPERATURE MEASUREMENT FOR SEMICONDUCTOR SUBSTRATES

CROSS-REFERENCES TO RELATED APPLICATIONS

The present application claims benefit under 35 U.S.C. § 119(e) of now expired U.S. Provisional Patent Application No. 60/862,186, filed Oct. 19, 2006, entitled "Methods and Systems for Performing Real-Time Wireless Temperature Measurements for Semiconductor Substrates," which is incorporated herein by reference in its entirety.

BACKGROUND OF THE INVENTION

The present invention relates generally to the field of substrate processing equipment. More particularly, the present invention relates to a method and apparatus for wirelessly measuring thermal characteristics of semiconductor processing apparatus. Merely by way of example, the method and apparatus of the present invention are used to measure bake plate temperature using a wireless monitor device. The method and apparatus can be applied to other processes for semiconductor substrates including other processing chambers.

Modern integrated circuits contain millions of individual elements that are formed by patterning the materials, such as silicon, metal and dielectric layers, that make up the integrated circuit to sizes that are small fractions of a micrometer. The technique used throughout the industry for forming such patterns is photolithography. A typical photolithography process sequence generally includes depositing one or more uniform photoresist (resist) layers on the surface of a substrate, drying and curing the deposited layers, patterning the substrate by exposing the photoresist layer to radiation that is suitable for modifying the exposed layer and then developing the patterned photoresist layer.

It is common in the semiconductor industry for many of the steps associated with the photolithography process to be performed in a multi-chamber processing system (e.g., a cluster tool) that has the capability to sequentially process semiconductor wafers in a controlled manner. One example of a cluster tool that is used to deposit (i.e., coat) and develop a photoresist material is commonly referred to as a track lithography tool.

Track lithography tools typically include a mainframe that houses multiple chambers (which are sometimes referred to herein as stations) dedicated to performing the various tasks associated with pre- and post-lithography processing. There are typically both wet and dry processing chambers within track lithography tools. Wet chambers include coat and/or develop bowls, while dry chambers include thermal control units that house bake and/or chill plates. Track lithography tools also frequently include one or more pod/cassette mounting devices, such as an industry standard FOUP (front opening unified pod), to receive substrates from and return substrates to the clean room, multiple substrate transfer robots to transfer substrates between the various stations of the track tool and an interface that allows the tool to be operatively coupled to a lithography exposure tool in order to transfer substrates into the exposure tool and to receive substrates after they have been processed within the exposure tool.

Over the years there has been a strong push within the semiconductor industry to shrink the size of semiconductor devices. The reduced feature sizes have caused the industry's tolerance to process variability to shrink, which in turn, has resulted in semiconductor manufacturing specifications having more stringent requirements for process uniformity and repeatability. An important factor in minimizing process variability during track lithography processing sequences is to ensure that every substrate processed within the track lithography tool for a particular application has the same "wafer history." A substrate's wafer history is generally monitored and controlled by process engineers to ensure that all of the device fabrication processing variables that may later affect a device's performance are controlled, so that all substrates in the same batch are always processed the same way.

To ensure that each substrate has the same "wafer history" requires that each substrate experiences the same repeatable substrate processing steps (e.g., consistent coating process, consistent hard bake process, consistent chill process, etc.) and the timing between the various processing steps is the same for each substrate. Lithography type device fabrication processes can be especially sensitive to variations in process recipe variables and the timing between the recipe steps, which directly affects process variability and ultimately device performance. Generally, characterization of processing operations is performed to determine the thermal properties of processing apparatus as a function of time.

In view of these requirements, the semiconductor industry is continuously researching methods and developing tools and techniques to improve the measurement capabilities associated with track lithography and other types of cluster tools.

SUMMARY OF THE INVENTION

According to the present invention, techniques related to the field of semiconductor processing equipment are provided. More particularly, the present invention relates to a method and apparatus for wirelessly measuring thermal characteristics of semiconductor processing apparatus. Merely by way of example, the method and apparatus of the present invention are used to measure bake plate temperature using a wireless monitor device. The method and apparatus can be applied to other processes for semiconductor substrates including other processing chambers.

According to an embodiment of the present invention, a monitor device is provided. The monitor device includes a substrate and a plurality of temperature sensors disposed in the substrate. The monitor device also includes a processor coupled to the substrate and adapted to receive one or more signals from the plurality of temperature sensors. The processor is further adapted to convert the one or more received signals into one or more converted signals. The monitor device further includes a transceiver coupled to the substrate and adapted to receive the one or more converted signals. The transceiver is further adapted to transmit one or more output signals to an external receiver.

According to another embodiment of the present invention, a measurement system for use in a processing chamber of a track lithography tool is provided. The measurement system includes a wireless temperature measurement wafer. The wireless temperature measurement wafer includes a plurality of thermal measurement devices in thermal contact with the wireless temperature measurement wafer, one or more processors coupled to the wireless temperature measurement wafer, and a transceiver coupled to the wireless temperature measurement wafer. The transceiver is adapted to receive an input signal from the one or more processors and transmit an RF data signal. The measurement system also includes a receiver adapted to receive the RF data signal, an external processor in communication with the receiver, and a display system in communication with the external processor.

According to a specific embodiment of the present invention, a method of measuring thermal properties of a bake plate in a bake chamber of a track lithography tool is provided. The method includes placing a wireless temperature measurement device in a FOUP, transferring the wireless temperature measurement device from the FOUP to the bake chamber, and positioning the wireless temperature measurement device on the bake plate. The method also includes detecting temperature signals at a plurality of bake plate locations, receiving the detected temperature signals at a processor, and processing the detected temperature signals to provide measurement data. The method further includes transmitting the measurement data from the wireless temperature measurement device to a receiver.

Many benefits are achieved by way of the present invention over conventional techniques. For example, embodiments of the present invention reduce the amount of memory provided on the wireless temperature measurement device. Additionally, embodiments of the present invention provide real-time or near real-time bake plate temperature maps, enabling process engineers increased visibility into thermal processes. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

According to the present invention, techniques related to the field of semiconductor processing equipment are provided. More particularly, the present invention relates to a method and apparatus for wirelessly measuring thermal characteristics of semiconductor processing apparatus. Merely by way of example, the method and apparatus of the present invention are used to measure bake plate temperature using a wireless monitor device. The method and apparatus can be applied to other processes for semiconductor substrates including other processing chambers.

Figure 1:
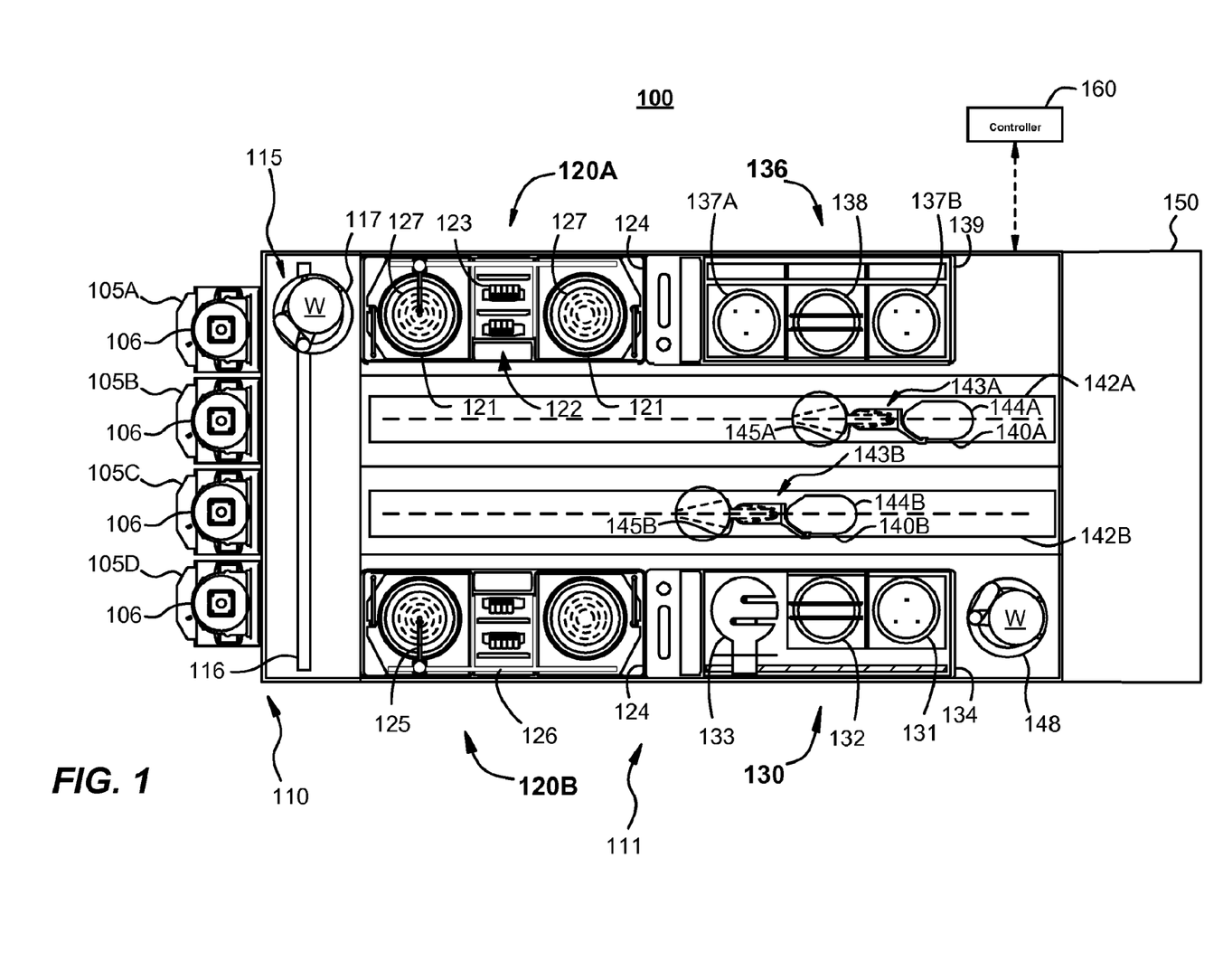
FIG. 1 is a simplified plan view of a track lithography tool according to an embodiment of the present invention.

FIG. 1 is a plan view of an embodiment of a track lithography tool in which the embodiments of the present invention may be used. As illustrated in FIG. 1, the track lithography tool contains a front end module 110 (sometimes referred to as a factory interface) and a process module 111. In other embodiments, the track lithography tool includes a rear module (not shown), which is sometimes referred to as a scanner interface. Front end module 110 generally contains one or more pod assemblies or FOUPS (e.g., items 105A, 105B, 105C, and 105D) and a front end robot assembly 115 including a horizontal motion assembly 116 and a front end robot 117. The front end module 110 may also include front end processing racks (not shown). The one or more pod assemblies 105A, 105B, 105C, and 105D are generally adapted to accept one or more cassettes 106 that may contain one or more substrates or wafers that are to be processed in the track lithography tool. The front end module 110 may also contain one or more pass-through positions (not shown) to link the front end module 110 and the process module 111.

Process module 111 generally contains a number of processing racks 120A, 120B, 130, and 136. As illustrated in FIG. 1, processing racks 120A and 120B each include a coater/developer module with shared dispense 124. A coater/developer module with shared dispense 124 includes two coat bowls 121 positioned on opposing sides of a shared dispense bank 122, which contains a number of dispense nozzles 123 providing processing fluids (e.g., bottom anti-reflection coating (BARC) liquid, resist, developer, and the like) to a wafer mounted on a substrate support 127 located in the coat bowl 121. In the embodiment illustrated in FIG. 1, a nozzle positioning member 125 sliding along a track 126 is able to pick up a dispense nozzle 123 from the shared dispense bank 122 and position the selected dispense nozzle over the wafer for dispense operations. Coat bowls with dedicated dispense banks are provided in alternative embodiments.

Processing rack 130 includes an integrated thermal unit 134 including a bake plate 131, a chill plate 132 and a shuttle 133. The bake plate 131 and the chill plate 132 are utilized in heat treatment operations including post exposure bake (PEB), post-resist bake, and the like. In some embodiments the shuttle 133, which moves wafers in the x-direction between the bake plate 131 and the chill plate 132, is chilled to provide for initial cooling of a wafer after removal from the bake plate 131 and prior to placement on the chill plate 132. Moreover, in other embodiments shuttle 133 is adapted to move in the z-direction, enabling the use of bake and chill plates at different z-heights. Processing rack 136 includes an integrated bake and chill unit 139, with two bake plates 137A and 137B served by a single chill plate 138.

One or more robot assemblies (robots) 140A and 140B are adapted to access the front-end module 110, the various processing modules or chambers retained in the processing racks 120A, 120B, 130, and 136, and the scanner 150. By transferring substrates between these various components, a desired processing sequence can be performed on the substrates. The two robots 140A and 140B illustrated in FIG. 1 are configured in a parallel processing configuration and travel in the x-direction along horizontal motion assembly 142A and 142B, respectively. Utilizing a mast structure (not shown), the robots 140A and 140B are also adapted to move orthogonal to the transfer direction. Utilizing one or more of three directional motion capabilities, robots 140A and 140B are able to place wafers in and transfer wafers between the various processing chambers retained in the processing racks that are aligned along the transfer direction.

Referring to FIG. 1, the first robot assembly 140A and the second robot assembly 140B are adapted to transfer substrates to the various processing chambers contained in the processing racks 120A, 120B, 130, and 136. In one embodiment, to perform the process of transferring substrates in the track lithography tool, robot assembly 140A and robot assembly 140B are similarly configured and include at least one horizontal motion assembly 142A and 142B, a vertical motion assembly 144A and 144B, and a robot hardware assembly 143A and 143B supporting a robot blade 145A and 145B. Robot assemblies 140A and 140B are in communication with a controller 160 that controls the system. In the embodiment illustrated in FIG. 1, a rear robot assembly 148 is also provided.

The scanner 150 is a lithographic projection apparatus used, for example, in the manufacture of integrated circuits. The scanner 150 exposes a photosensitive material that was deposited on the substrate in the cluster tool to some form of radiation to generate a circuit pattern corresponding to an individual layer of the integrated circuit device to be formed on the substrate surface.

Each of the processing racks 120A, 120B, 130, and 136 contain multiple processing modules in a vertically stacked arrangement. That is, each of the processing racks may contain multiple stacked coater/developer modules with shared dispense 124, multiple stacked integrated thermal units 134, multiple stacked integrated bake and chill units 139, or other modules that are adapted to perform the various processing steps required of a track photolithography tool. As examples, coater/developer modules with shared dispense 124 may be used to deposit a bottom antireflective coating (BARC) and/or deposit and/or develop photoresist layers. Integrated thermal units 134 and integrated bake and chill units 139 may perform bake and chill operations associated with hardening BARC and/or photoresist layers after application or exposure.

In one embodiment, controller 160 is used to control all of the components and processes performed in the cluster tool. The controller 160 is generally adapted to communicate with the scanner 150, monitor and control aspects of the processes performed in the cluster tool, and is adapted to control all aspects of the complete substrate processing sequence. The controller 160, which is typically a microprocessor-based controller, is configured to receive inputs from a user and/or various sensors in one of the processing chambers and appropriately control the processing chamber components in accordance with the various inputs and software instructions retained in the controller's memory. The controller 160 generally contains memory and a CPU (not shown) which are utilized by the controller to retain various programs, process the programs, and execute the programs when necessary. The memory (not shown) is connected to the CPU, and may be one or more of a readily available memory, such as random access memory (RAM), read only memory (ROM), floppy disk, hard disk, or any other form of digital storage, local or remote. Software instructions and data can be coded and stored within the memory for instructing the CPU. The support circuits (not shown) are also connected to the CPU for supporting the processor in a conventional manner. The support circuits may include cache, power supplies, clock circuits, input/output circuitry, subsystems, and the like all well known in the art. A program (or computer instructions) readable by the controller 160 determines which tasks are performable in the processing chambers. Preferably, the program is software readable by the controller 160 and includes instructions to monitor and control the process based on defined rules and input data.

It is to be understood that embodiments of the invention are not limited to use with a track lithography tool such as that depicted in FIG. 1, but may be used in any track lithography tool including the many different tool configurations described in U.S. patent application Ser. No. 11/112,281 entitled "Cluster Tool Architecture for Processing a Substrate" filed on Apr. 22, 2005 now U.S. Pat. No. 7,357,842, and pending U.S. patent application Ser. No. 11/315,984 entitled "Cartesian Robot Cluster Tool Architecture" filed on Dec. 22, 2005, both of which are hereby incorporated by reference for all purposes. In addition, embodiments of the invention may be used in other semiconductor processing equipment.

Figure 2:
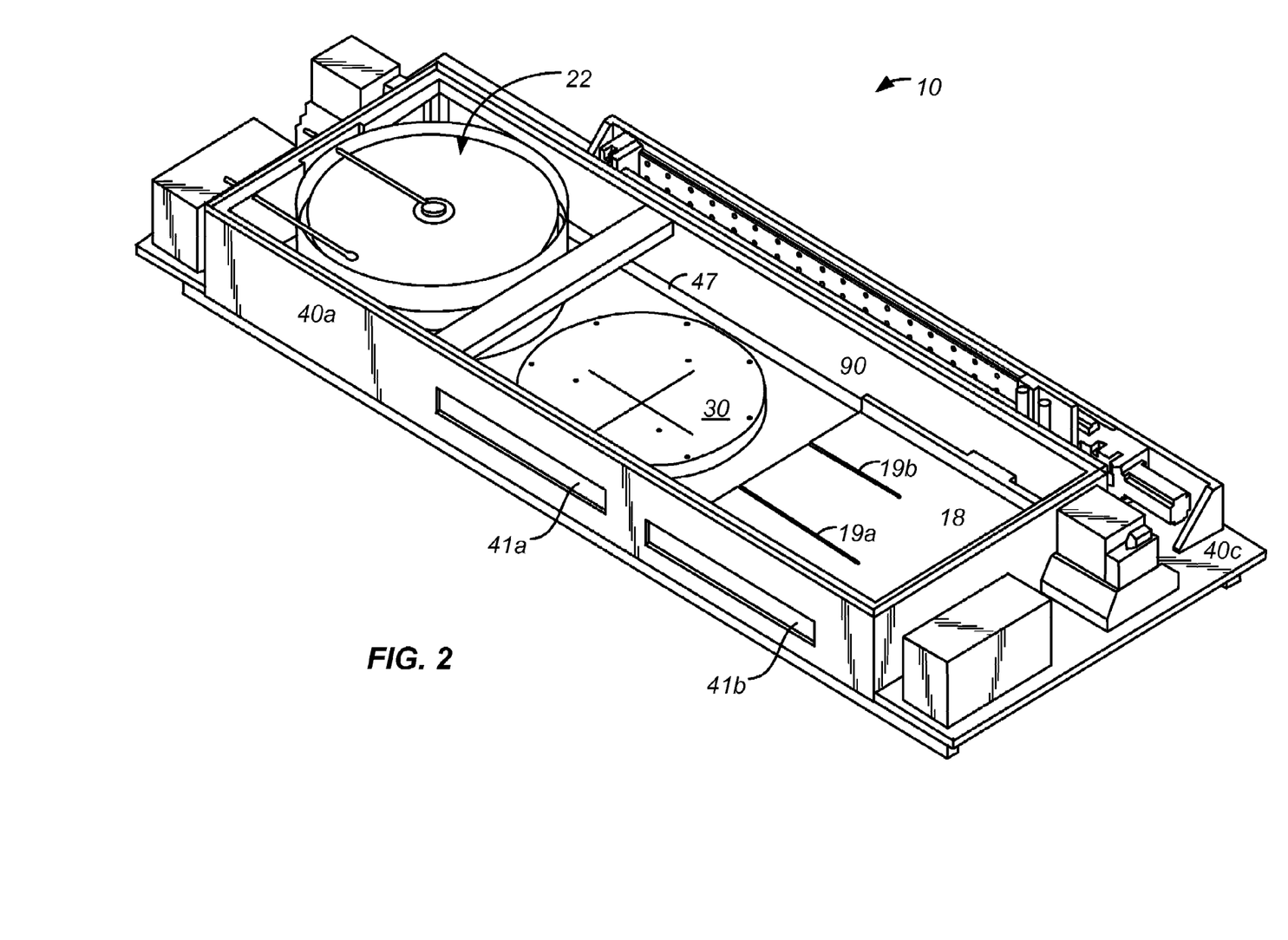
FIG. 2 is a simplified cut-away perspective view of a thermal unit according to an embodiment of the present invention.

FIG. 2 is a simplified cut-away perspective view of a thermal unit according to an embodiment of the present invention. As illustrated in FIG. 2, the thermal unit 10 is shown in a cut-away view in which the top cover (not shown) is removed. The thermal unit 10 is serviced by a central robot through wafer transfer slots 41a and 41b in surface 40a. Generally, substrates enter the thermal unit through wafer transfer slot 41b and are placed on the shuttle 18. The shuttle delivers the substrate to the chill plate 30 and the clam shell enclosure 22 as appropriate to the particular thermal processes being performed on the substrate. The thermal unit 10 includes a shuttle 18, a chill plate 30, and clam shell enclosure 22 in which substrates are baked during portions of the lithography process. Lift pin slots 19a and 19b are provided in shuttle 18 to enable lift pins supporting the wafer to pass through the body of the shuttle. Also visible is a space 47 between rear support piece 90 of the housing and a bottom piece 40c. Space 47 extends along much of the length of thermal unit 10 to allow shuttle 18 to transfer wafers between bake and chill plates in the thermal unit.

Clam shell enclosure 22 contains a bake plate (not shown). In some embodiments, the bake plate is a multi-zone heater plate adapted to provide controlled heating to various portions of a substrate mounted on the bake plate. Additionally, some embodiments provide for a single-zone or multi-zone lid for the clam shell enclosure 22. The wireless temperature measurement device provided herein is able to provide real-time temperature measurements at all positions inside the thermal unit, including chill plate 30, shuttle 18, and the bake plate inside clam shell enclosure 22.

Additional description of thermal units provided according to embodiments of the present invention is provided in commonly assigned U.S. patent application Ser. No. 11/174,988, filed on Jul. 5, 2005 now U.S. Pat. No. 7,282,672 and hereby incorporated by reference in its entirety for all purposes.

Embodiments of the present invention are utilized in temperature measurement processes performed on bake plates used for post-application-bake (PAB) and/or post-exposure-bake (PEB) processes. Uses are not limited to these processes as the measurement and characterization of other temperature control structures are included within the scope of embodiments of the present invention. These other temperature control structures include chill plates, develop plates, and the like. One of ordinary skill in the art would recognize many variations, modifications, and alternatives.

Figure 3A:
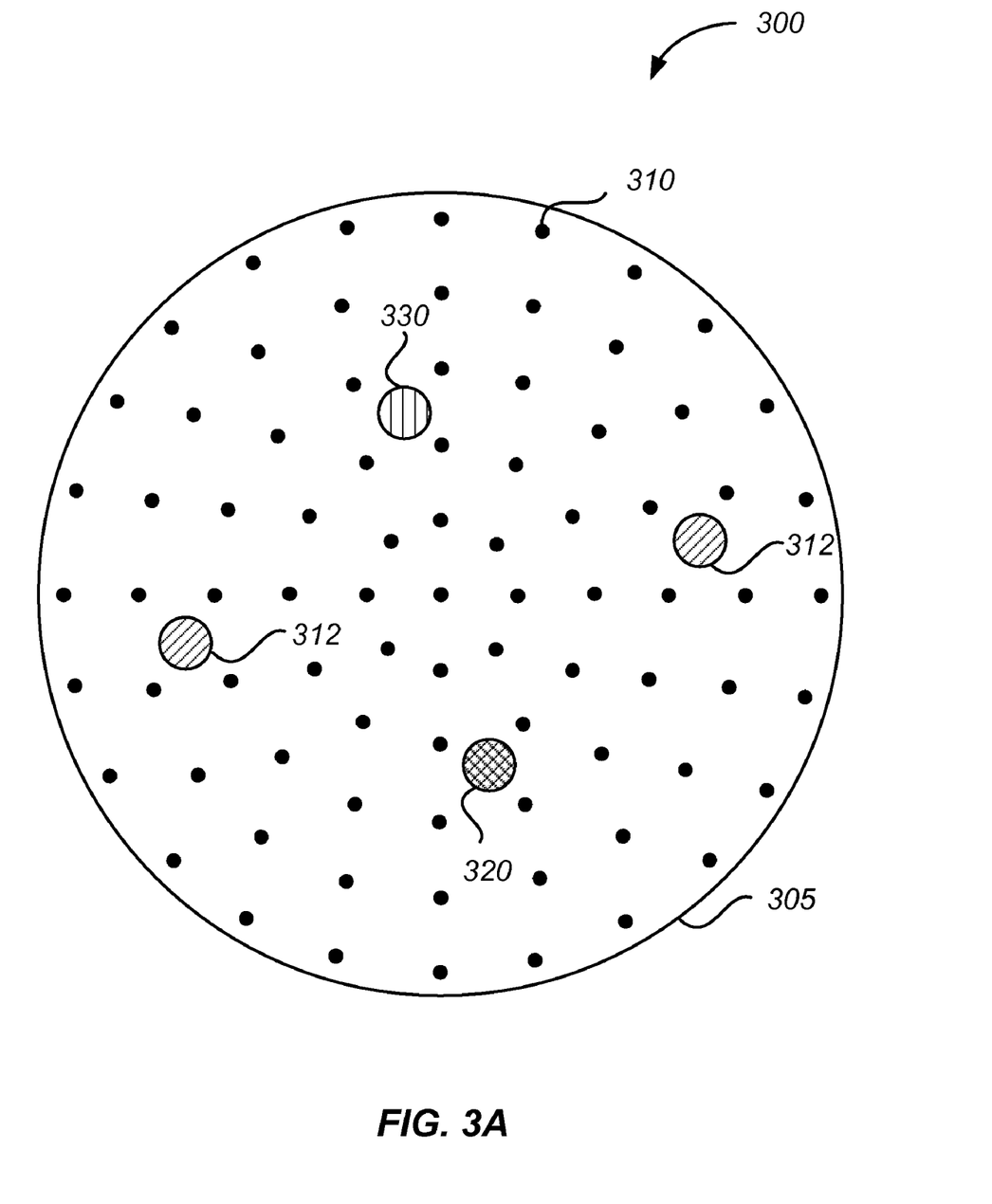
FIG. 3A is a simplified top-view illustration of a wireless temperature measurement device according to an embodiment of the present invention.

FIG. 3A is a simplified top-view illustration of a wireless temperature measurement device according to an embodiment of the present invention. The wireless temperature measurement device 300 includes a substrate 305. In an embodiment, the substrate 305 is fabricated from a silicon wafer. The dimensions of the substrate 305 are selected to be similar to the dimensions of device substrates processed using the bake chamber illustrated in FIG. 2. Thus, for bake chambers adapted to process 300 mm device substrates, the substrate 305 is approximately 300 mm in diameter and approximately 750 microns thick. As will be evident to one of skill in the art, the fabrication of substrate 305 from a silicon wafer enables the wireless temperature measurement device 300 to possess thermal properties similar to actual device substrates processed in the bake chamber.

One or more power supplies 312 (e.g., two batteries) are embedded in or mounted on substrate 305 as illustrated in FIG. 3A. As described more fully throughout the present specification, the power supplies 312 provides power for various components present on or in substrate 305. As an example, the power supply 312 may provide power for temperature sensors, one or more processors, and one or more transceivers as described more fully below. In a specific embodiment, the power supply 312 is a battery with dimensions selected so that power supply is embedded in substrate 312 with the upper surface of the power supply flush with the upper surface of the substrate. In other embodiments, as described more fully below, the power supply 312 is mounted on an upper surface of the substrate 305. The battery may be a replaceable battery, thereby extending the useful life of the wireless temperature measurement device.

A number of temperature sensors 310 are disposed in substrate 305 to provide temperature signals associated with various portions of the substrate. In an embodiment, the temperature sensors 310 are distributed in an array pattern across the substrate, thereby providing a grid-based temperature map of substrate 305. In other embodiments, the temperature sensors 310 are distributed in other patterns (e.g., circular patterns with increasing radius) as appropriate the particular application. For example, in applications utilizing a multi-zone bake plate, the temperature sensors may be distributed in view of the shapes and numbers of zones in the multi-zone bake plate. Accordingly, one or more temperature sensors may be provided in each of the zones and distributed throughout each zone to provide a temperature map of each zone. In a particular embodiment, 61 thermistors are utilized to provide temperature readings for the wireless temperature measurement device. Of course, the particular number utilized will depend on the application. Thermistors available from U.S. Sensor of Orange, Calif. may be utilized, providing a maximum temperature of 150° C., a 1-2 second thermal time constant, and an accuracy of ±0.05° C. In other embodiments, the temperature sensors utilized herein may include thermocouples, resistive thermal devices (RTDs), other thermistors, combinations of these, and the like.

The vertical positioning of the temperature sensors in the substrate may be uniform as a function of substrate position or varied. For example, controlled vertical variations in temperature sensor position may be utilized to determine the heat flux in a direction normal to the surface of the substrate. In a particular embodiment, the majority of the temperature sensors are positioned a first predetermined distance from the upper surface of the substrate and several temperature sensors are positioned at a second predetermined distance greater than the first predetermined distance. Accordingly, the majority of the temperature sensors provide temperature data associated with the substrate surface and the several temperature sensors provide temperature data associated with temperature variations normal to the substrate surface.

A processor 320 (e.g., a CPU) and a transceiver 330 are provided as part of the wireless temperature measurement device 300. Referring to the embodiment illustrated in FIG. 3A, analog data measured at the temperature sensors 310 is communicated to processor 320 through a number of electrical connectors (not shown). Processor 320 is adapted to receive one or more temperature signals from the plurality of temperature sensors and to convert the one or more receive signals into one or more converted signals. In a particular embodiment, the processor receives analog temperature signals and outputs digital data. In addition to analog-to-digital (A/D) conversion processes, processor 320 is adapted to perform data compression, error correction coding, encoding, communication modulation, combinations thereof, and the like. Processor 320 may include one or more memories, which may be utilized in processing of data and instructions. One of ordinary skill in the art would recognize many variations, modifications, and alternatives.

It is understood that the various functional blocks otherwise referred to herein as processors, including those shown in FIG. 3A, may be included in one or more general purpose processors configured to execute instructions and data. In some embodiments, such blocks may be carried out using dedicated hardware such as an application specific integrated circuit (ASIC). In yet other embodiments, such blocks and the processing of the temperature signals may be carried out using a combination of software and hardware. As an example, such processors include dedicated circuitry, ASICs, combinatorial logic, other programmable processors, combinations thereof, and the like. Thus, processors as provided herein are defined broadly and include, but are not limited to temperature signal processors adapted to process temperature signals and provide signals suitable for subsequent transmission by a transceiver as described below.

A transceiver 330 is provided in communication with processor 320 and is adapted to receive the one or more converted signals and transmit one or more output signals to an external receiver. The transceiver 330 may include additional processing capability in addition to the capability provided by processor 320. As an example, the transceiver 330 may perform modulation of the converted signals as appropriate to the wireless transmission protocols utilized. For example, frequency modulation, amplitude modulation, phase modulation, and other communications techniques may be implemented utilizing the processor 320, the transceiver 330, or such devices in combination.

In an embodiment, the wireless transceiver is capable of providing radio frequency communications between the wireless measurement device and a receiver in communication with an external monitor. The radio frequency communications provided by embodiments of the present invention include, without limitation, a range of frequencies, modulation techniques, and the like. For example, a transceiver operating using the Bluetooth® short range wireless connectivity standard may be employed. Other radio frequency standards may also be utilized as appropriate to the particular applications.

Figure 3B:
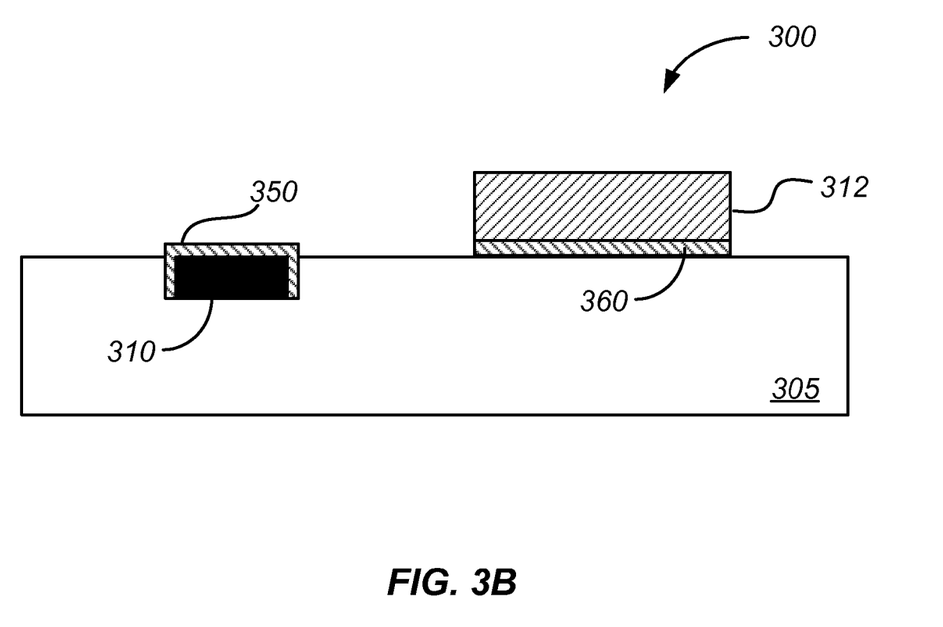
FIG. 3B is a simplified cross-sectional view of a wireless temperature measurement device according to an embodiment of the present invention.

FIG. 3B is a simplified cross-sectional view of a wireless temperature measurement device according to an embodiment of the present invention. Various components of the wireless temperature measurement device are illustrated in FIG. 3B. For purposes of clarity, not all components are illustrated. Moreover, the cross-sectional view provided in FIG. 3B does not represent any particular cross-section of the device illustrated in FIG. 3A. Rather, the cross-sectional view provided in FIG. 3B is merely intended to illustrate a technique for mounting various components of the wireless temperature measurement device in a particular embodiment of the present invention. One of ordinary skill in the art would recognize many variations, modifications, and alternatives.

Referring to FIG. 3B, a temperature sensor 310 and a power supply 312 are provided as components of the wireless temperature measurement device 300. The temperature sensor 310 is embedded in an upper surface of the substrate 305 and encased in a thermally conductive epoxy 350. Electrical connections between the temperature sensors and the processor are not illustrated for purposes of clarity. In the illustrated embodiment, the temperature sensor 310, for example, a thermistor, is mounted so the upper surface of the temperature sensor is flush with the upper surface of the substrate 305.

However, in other embodiments, the temperature sensor is mounted to provide a predetermined distance (either embedded or exposed) between the upper surface of the substrate and the upper surface of the temperature sensor. One of ordinary skill in the art would recognize many variations, modifications, and alternatives.

Power supply 312 is mounted on the upper surface of the substrate 305 in a surface mount configuration and bonded to the surface using a thermally insulating bonding material 360, which is characterized by a lower thermal conductivity. Electrical connections between the power supply and other components are not illustrated for purposes of clarity. In an embodiment, the power supply 312 extends to a height of 2 mm above the upper surface of the substrate 305. In other embodiments, the height is greater than or less than 2 mm as appropriate to the particular application. According to some embodiments, the processor 320 and the transceiver 330 are mounted in a manner similar to that illustrated for the power supply 312, extending to a similar height above the substrate surface.

Figure 4:
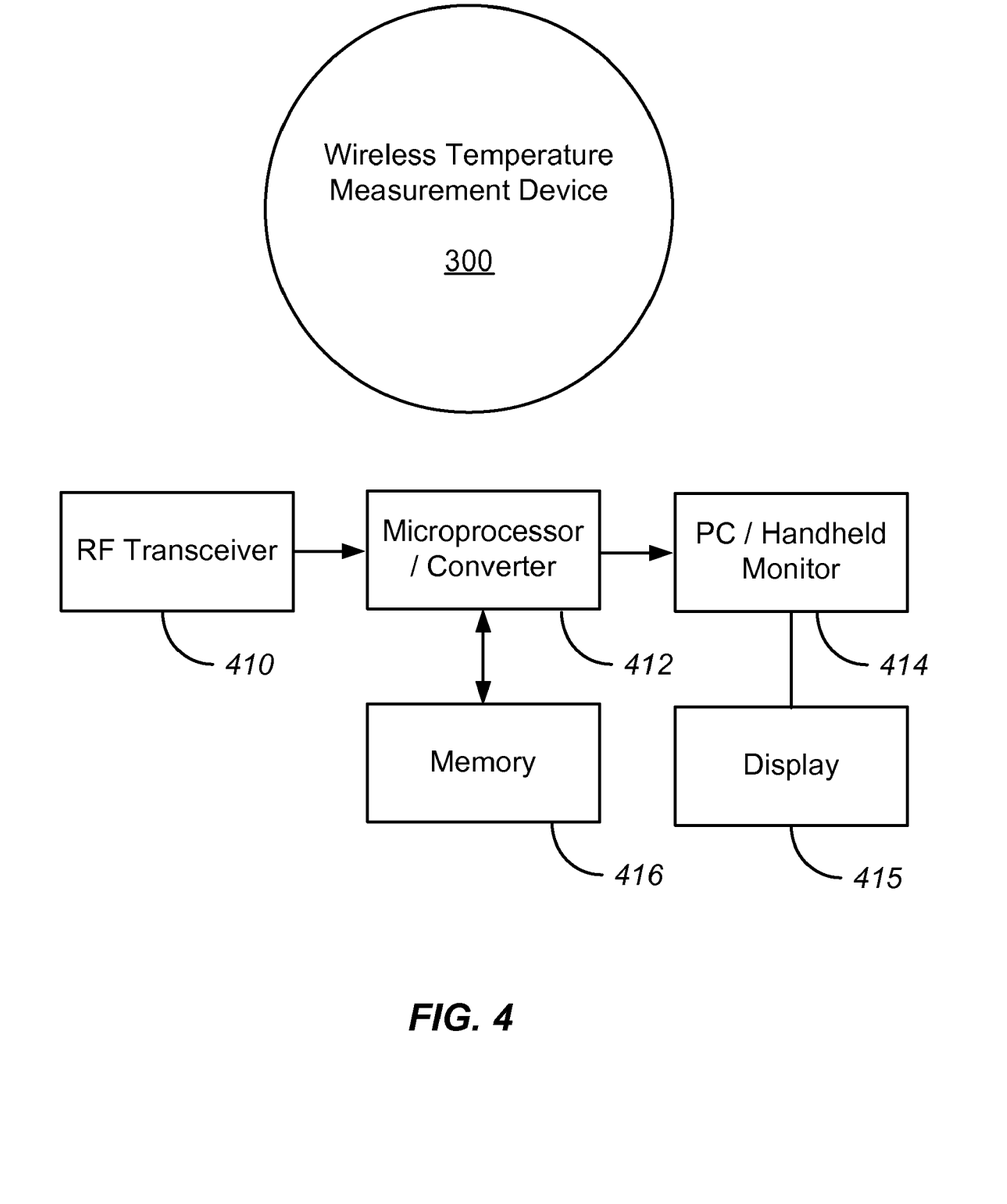
FIG. 4 is a simplified schematic diagram of a system utilizing a wireless temperature measurement device according to an embodiment of the present invention.

In contrast with conventional wired measurement wafers, data is transmitted from the wireless temperature measurement device 310 to an external receiver through a wireless communications link. Thus, the wires associated with conventional wired measurement wafers, along with their operational drawbacks, are not utilized according to embodiments of the present invention. FIG. 4 is a simplified schematic diagram of a system utilizing a wireless temperature measurement device according to an embodiment of the present invention. The system includes the wireless temperature measurement device 300, an RF transceiver 410, a microprocessor 412, and a personal computer or other monitor device 414. An optional display 415 is provided in some embodiments. Wireless signals from the wireless temperature measurement device 300 are received at the transceiver 410 and then processed and displayed using components of the system. As described more fully throughout the present specification, two-way communications are provided in some embodiments.

Embodiments of the present invention provide cost savings compared to other measurement wafers, some of which utilize a docking station to transfer data from the measurement wafer to a computer or other processing and display system. As described more fully below, the wireless temperature measurement device may be stored in a FOUP or other suitable location in the track lithography tool. Because data transfer is performed wirelessly, no docking station is utilized in embodiments of the present invention and cost savings result.

In a particular embodiment, data associated with a particular bake chamber of a track lithography tool may be utilized by the processor 320 and/or the transceiver 330. For example, a bake chamber identification number may be provided to the wireless temperature measurement device and processing of the temperature signals is performed in light of the chamber identification. Thus, rather than providing a bake plate temperature map, output data may be provided in the form of temperature variations from previous bake plate temperature readings for the particular bake plate, variations from average bake plate temperature readings, and the like. Comparisons between current bake plate temperatures and historical data may be performed and current data may be compressed to reduce transmission bandwidth. One of ordinary skill in the art would recognize many variations, modifications, and alternatives.

Data transmitted from the wireless temperature measurement device is received at external RF transceiver 410. In an embodiment, the RF transceiver 410 is integrated with the bake chamber and in communication with the controller, for example, controller 160 as illustrated in FIG. 1. In another embodiment, the external RF transceiver and other components are integrated into a robot blade. Additional processing of data received from the wireless temperature measurement device may be performed by external processor 412 in communication with the external receiver. Additionally, data received from a wireless temperature measurement device may be stored in one or more memories 416 and displayed (e.g., using a spreadsheet, GUI, and the like) as appropriate to the particular application.

Measurement systems provided herein provide a system operator with the capability to collect thermal data related to the bake plate and transmit such data to a remote location in near real-time. Throughout the present specification, the terms real-time and near real-time are used interchangeably and are not intended to limit the scope of embodiments as they are both included within the scope of the present invention. After processing by the processor 320, processed data is transmitted in some embodiments without the need to store data on the wireless temperature measurement device 300. Thus, embodiments of the present invention provide for reductions in errors resulting during the storage process such as read, write, and similar operations. In some applications, such as electronic memories, levels of data corruption increase as a function of temperature. Therefore, provision of memory on the measurement wafer generally requires error correction and other techniques to prevent the data corruption from impacting measurement results. In contrast with storage systems, processed data is transmitted as created, reducing the use of storage processes and accompanying problems.

Data analysis functions can be performed either using the processor 320, using one or more external processors 412, or using a combination thereof. Depending on the data analysis tasks, data compression, data interpretation, historical analysis, chamber-specific analysis, and the like can be performed. Data stored after receipt by the external transceiver 410 can be used in performing data analysis functions such as tracking tool performance as a function of time and the like.

Embodiments of the present invention provide a capability to store amounts of data significantly higher than available using conventional techniques. In conventional wireless characterization wafers, the volume of data stored on the characterization wafer is limited by the capacity of memories resident on the characterization wafer. Utilizing the real-time data transmission capabilities of embodiments described herein, such data volume constraints are significantly reduced as data is transmitted as collected and processed. The high data rates characteristic of radio frequency communications links provides for transmission of data to the external transceiver 410, after which transmitted data can be further processed and stored utilizing computer systems having low-cost and high-reliability memory. Thus, embodiments of the present invention provide for increases in the amount of data that can be stored for a particular characterization run in comparison with conventional techniques and devices.

Embodiments of the present invention reduce the time between data collection and analysis through the use of real-time data transmission. In conventional wireless measurement systems, the high temperatures associated with typical bake processes necessitate that handling of a conventional wireless measurement wafer is delayed until the measurement wafer has cooled sufficiently. After cooling of the measurement wafer, the measurement wafer is transferred to a docking station and data collected during characterization experiments can be downloaded and analyzed. In contrast with these conventional wireless measurement systems, wireless transmission of data in real-time reduces or eliminates the need to wait for the measurement wafer to cool to a temperature appropriate for handling. Accordingly, increases in throughput are provided herein.

Moreover, real-time and near real-time capabilities provided herein enable a process engineer to perform enhanced process control trouble-shooting operations not generally possible using conventional measurement techniques and systems. For example, bake plate temperature readings obtained in real-time enable a process engineer to provide inputs to the bake plate controller and obtain measurement results during a process run.

Utilizing the real-time data collection and transmission characteristics of the wireless temperature measurement device, the thermal measurement of multiple modules may be performed, enabling an improved understanding of the thermal stability of the entire processing system and subsystems. For example, these modules may include the bake plate, the chill plate, and the like. Using one or more wireless temperature measurement devices, the whole thermal history of the processed substrate is characterized. In conventional systems, data from various processing steps is placed into memory and then post-processed. Utilizing embodiments of the present invention, an operator can change a process variable (e.g., opening a slit valve) and watch the impact of the process variable in real-time, thereby providing low-latency insight into the thermal characteristics of the process chamber and processed devices.

In process chambers with multi-zone components or modules (e.g., a multi-zone bake plate), real-time tuning of the process chamber and components allows for faster tuning of the multi-zone components. For example, it is possible to run a response algorithm with confirmation provided in real-time. Embodiments of the present invention provide a form factor similar to actual processed substrates and no data wires, which prevent proper thermal characterization as a result of the existence of the data wires. Accordingly, the thermal characteristics experienced by the wireless temperature measure devices are similar or identical to those experienced by an actual processed substrate. Thus, processing the wireless temperature measurement device in actual processing conditions results in process characterization being performed in actual substrate processing conditions or very similar conditions. In some applications, a wireless temperature measurement device is inserted into the track lithography tool as one wafer in a lot, providing real-time analysis such as a check for the "health" of the PEB and for comparison with process specifications.

According to some embodiments, two-way communications are provided between the wireless temperature measurement device and the external receiver. Although not illustrated in FIG. 4, dual RF communication links may be utilized to not only receive data transmitted from the wireless temperature measurement device, but also to transmit data from external components to the wireless temperature measurement device. Merely by way of example, a system with two-way communications could provide a system operator with real-time control over the data collection process. Both control signals and data can be transmitted from external components to the wireless temperature measurement device.

As an example, monitoring of a particular portion of the bake plate with an increased temporal resolution is provided herein. In this example, an operator transmits a command to the wireless temperature measurement device to increase the data transfer rate from a particular group of temperature sensors. At the higher data rate for the group, the time delay between successive temperature measures for the particular region is decreased, providing finer temporal resolution. Thus, real-time adjustments can be made in the data rates for the particular portion while maintaining other portions at default data rates.

Another embodiment of the present invention utilizes data related to the processing chamber (e.g., bake chamber) in conjunction with data received from the wireless temperature measurement device. As an example, each chamber in a track lithography tool may be assigned a unique identifier, stored, for example, in an RFID tag. As a two-way communication variation of techniques discussed above, the external components can poll the bake chamber to determine the chamber's unique identifier and utilize this information in processing, analyzing, and storing the thermal information received from the wireless temperature measurement device. In other embodiments, the RFID tag for the chamber is polled by the transceiver 330 present on the wireless temperature measurement device and data is analyzed or processed using processor 320 in light of the chamber identifier. Information specific to the chamber can thus be transmitted to the wireless temperature measurement device as well as the external components. Merely by way of example, utilizing such chamber-specific information, deviations from default parameters, run-to-run comparisons, and the like can be provided. One of ordinary skill in the art would recognize many variations, modifications, and alternatives.

Figure 5:
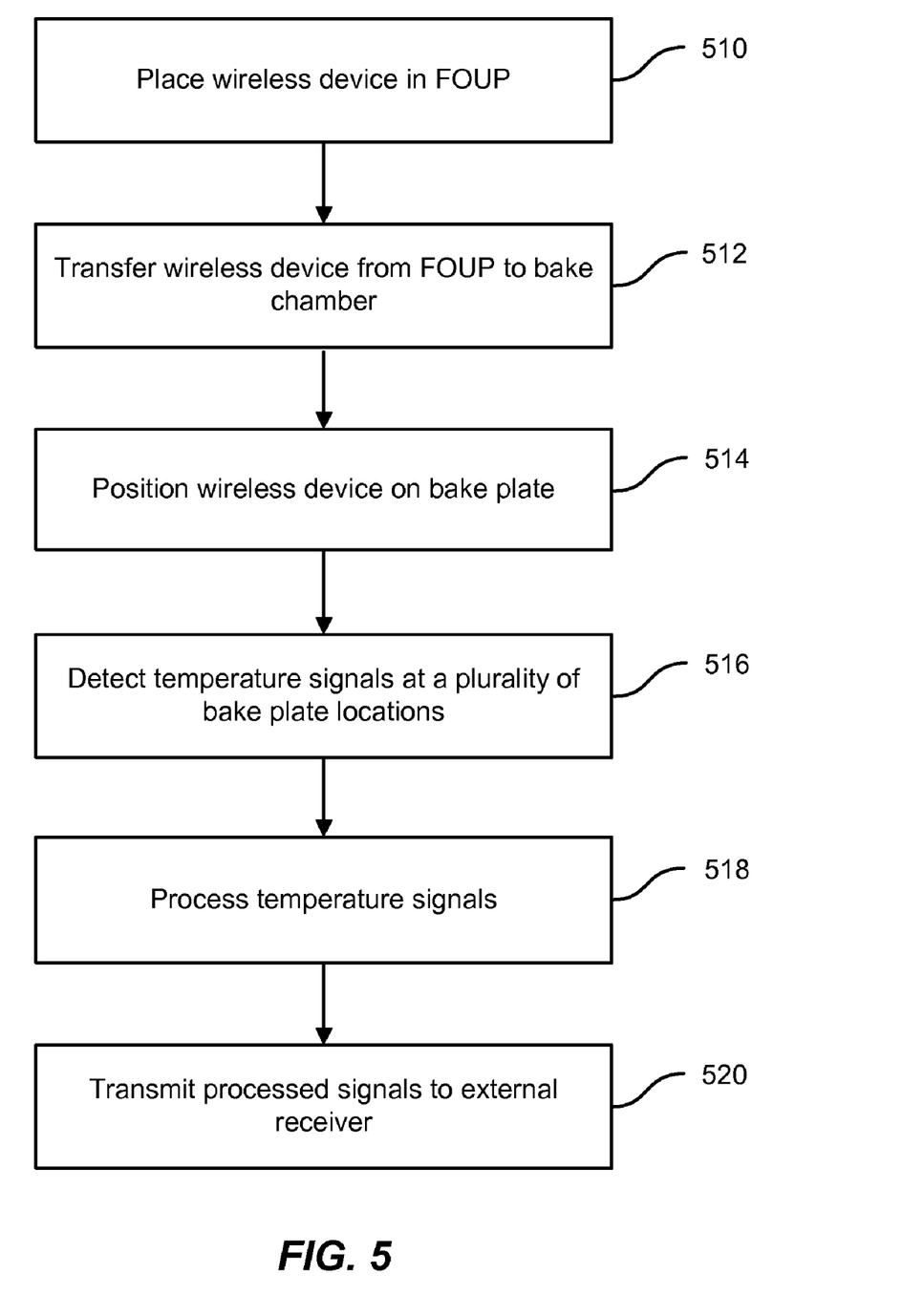
FIG. 5 is a simplified flowchart illustrating a method of measuring thermal properties of a bake plate in a track lithography tool according to an embodiment of the present invention.

FIG. 5 is a simplified flowchart illustrating a method of measuring thermal properties of a bake plate in a bake chamber of a track lithography tool according to an embodiment of the present invention. The method includes placing a wireless temperature measurement device in a FOUP (510). Prior to placing the wireless measurement device in the FOUP, an identifier associated with the wireless temperature measurement device may be recorded in one or more memories. Additionally, recording the identifier may be performed using a wireless data transmission process. The FOUP may contain the wireless temperature measurement device as well as a number of device wafers to be processed. The wireless temperature measurement device is transferred from the FOUP to the bake chamber (512) and the wireless temperature measurement device is positioned on the bake plate (514). The use of robotics and control systems to perform such transfer and positioning operations will be evident to one of skill in the art.

According to embodiments of the present invention, the bake plate is a multi-zone bake plate with a number of independently controllable zones. Additional description of bake plates that may be characterized utilizing embodiments of the present invention is provided in commonly assigned pending U.S. patent application Ser. No. 11/483,832, filed on Jul. 7, 2006, entitled "Zone control heater plate for track lithography systems," and hereby incorporated by reference in its entirety for all purposes.

Temperature signals are detected at a plurality of bake plate locations (516). Temperature signals may be provided by thermocouples, RTDs, thermistors, and other thermal measurement devices. In embodiments utilizing multi-zone bake plates, the plurality of bake plate locations may include a first location in a first bake plate zone and a second location in a second bake plate zone. The detected temperature signals are received and processed at a processor that is coupled to the wireless temperature measurement device (518). In an embodiment, the temperature sensors and processor are mounted on the wireless temperature measurement device, embedded in the wireless temperature measurement device, or a combination thereof. Accordingly, processing of the detected temperature signals is performed on the wireless temperature measurement device in some embodiments. The processor is adapted to process the detected temperature signals to provide measurement data. Such processing may include performing an analog-to-digital conversion process.

After processing, the measurement data is transmitted from the wireless temperature measurement device to an external receiver (520). According to embodiments of the present invention, the transmission process includes a wireless transmission process. Additionally, after measurements are performed, the wireless temperature measurement device may be transferred back from the bake chamber to the FOUP or another suitable location in the track lithography tool.

It should be appreciated that the specific steps illustrated in FIG. 5 provide a particular method of measuring thermal properties of a bake plate according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Referring once again to FIG. 4, post-transmission processing of the measurement data may be performed by processor 412. Data processed by processor 412 may be stored in one or more memories 416, which may also be utilized during data processing operations. As will be evident to one of skill in the art, the processor 412 and memory 416 are not limited by the physical characteristics of the wireless temperature measurement device 300, but can be optimized as appropriate to the data processing and storage operations provided herein. Transmission of measurement data and subsequent storage in memory 416 provides for flexibility not available using conventional measurement wafers, including the capability to store virtually unlimited amounts of data in memory 416.

Embodiments of the present invention provide methods and systems in which measurement data is transmitted from the wireless temperature measurement device to the external receiver in a real-time or near real-time manner. Thus, transmitting of the measurement data may be performed concurrently with detecting the temperature signals. In a particular embodiment, the measurement data is transmitted within a predetermined time after the temperature signals are detected. Thus, for example, data transmission may be performed less than one minute after detecting the temperature signals. Accordingly, for a 90 second bake process, transmission of measurement data is initiated prior to the end of the bake process. In some embodiments, the transmission of measurement data begins during the bake process and continues after the bake process is completed. As discussed above, the real-time transmission of measurement data enables systems that utilize a reduced amount of memory resident on the measurement device. In some embodiments, no memory dedicated to the storage of temperature data (other than that utilized in processing the temperature signals) is provided on the wireless temperature measurement device.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A monitor device comprising:
   a substrate;
   a plurality of temperature sensors disposed in the substrate;
   a processor disposed on the substrate and adapted to:
      receive one or more signals from the plurality of temperature sensors; and
      convert the one or more received signals into one or more converted signals; and
   a transceiver coupled to the substrate and adapted to:
      receive the one or more converted signals; and
      transmit one or more output signals to an external receiver.

2. The monitor device of claim 1 wherein the substrate comprises a silicon wafer.

3. The monitor device of claim 1 wherein the plurality of temperature sensors comprise at least one of thermocouples, resistive thermal devices, or thermistors.

4. The monitor device of claim 1 wherein the transceiver is adapted to perform modulation of the one or more converted signals.

5. The monitor device of claim 1 further comprising a power supply coupled to the substrate.

6. The monitor device of claim 5 wherein the power supply is mounted on the substrate in a surface mount configuration.

7. The monitor device of claim 1 wherein converting the one or more received signals comprises performing an analog-to-digital conversion process.

8. The monitor device of claim 7 wherein converting the one or more received signals further comprises performing at least one of an error correction process or a data compression process.

9. A measurement system for use in a processing chamber of a track lithography tool, the measurement system comprising:
   a wireless temperature measurement wafer comprising:
      a plurality of thermal measurement devices in thermal contact with the wireless temperature measurement wafer;
      one or more processors disposed on the wireless temperature measurement wafer and adapted to convert a signal received from the plurality of thermal measurement devices; and
      a transceiver coupled to the wireless temperature measurement wafer, wherein the transceiver is adapted to receive an input signal from the one or more processors and transmit an RF data signal;
   a receiver adapted to receive the RF data signal from the transceiver;
   an external processor in communication with the receiver; and
   a display system in communication with the external processor and configured to display data received from the external processor.

10. The measurement system of claim 9 further comprising a power supply coupled to the wireless temperature measurement wafer.

11. The measurement system of claim 9 wherein the wireless temperature measurement wafer comprises a silicon wafer.

12. The measurement system of claim 9 wherein the plurality of thermal measurement devices comprise at least one of thermocouples, resistive thermal devices, or thermistors.

13. The measurement system of claim 9 wherein the RF data signal comprises a modulated signal.

14. The measurement system of claim 9 wherein the processing chamber comprises a bake plate.

15. The measurement system of claim 14 wherein the bake plate comprises a multi-zone bake plate.

16. The measurement system of claim 9 wherein the one or more processors are adapted to perform an analog-to-digital conversion process.

17. The measurement system of claim 16 wherein the one or more processors are further adapted to perform at least one of an error correction process or a data compression process.

* * * * *